United States Patent [19]

Ko

[11] 3,739,177

[45] June 12, 1973

[54] LIGHT SENSITIVE CONTROL

[75] Inventor: Wen H. Ko, Cleveland, Ohio

[73] Assignee: North American Manufacturing Company, Cleveland, Ohio

[22] Filed: Dec. 15, 1970

[21] Appl. No.: 98,301

[52] U.S. Cl. ............................. 250/206, 250/219 R
[51] Int. Cl. ........................................... G01n 21/30
[58] Field of Search..................... 250/83.3 H, 202, 250/206, 219 DR, 219 D, 217 R, 219; 328/3

[56] References Cited
UNITED STATES PATENTS

| | | | |
|---|---|---|---|
| 3,436,540 | 4/1969 | Lamorlette | 250/83.3 H |
| 3,566,119 | 2/1971 | Lewis | 250/83.3 H |
| 3,108,727 | 10/1963 | Farber | 250/219 DR |
| 3,475,099 | 10/1969 | Yasuda et al. | 250/217 R |
| 2,907,889 | 10/1959 | Nichols et al. | 250/217 R |
| 3,423,596 | 1/1969 | French | 250/217 R |
| 3,334,236 | 8/1967 | Bacon | 250/227 |
| 3,440,431 | 4/1969 | Cicchiello | 250/219 D |

*Primary Examiner*—James W. Lawrence
*Assistant Examiner*—Harold A. Dixon
*Attorney*—Meyer, Tilberry & Body

[57] ABSTRACT

Presence or location of an object is detected or movement thereof is controlled by projecting light at the location where the object or the edge thereof is expected and detecting transmitted or reflected light by a photoelectric responsive device. The photoelectric responsive device is connected to a circuit which actuates either an indicator of the location of the object in the illuminated field or actuates mechanism for readjusting the position or direction of the movement of the object. The effect of variations in ambient or extraneous light or flashes of light is overcome by pulsing the projected light at a suitable rate and causing the photoelectric response circuit to be responsive only to electrical currents having the same pulse wave form as the light source with means for synchronizing the electric detector circuit with the light source.

6 Claims, 13 Drawing Figures

INVENTOR.
WEN H. KO
BY
Meyer, Tilberry & Body
ATTORNEYS

INVENTOR.
WEN H. KO
BY
Meyer, Tilberry & Body
ATTORNEYS

FIG. 11
DETECTOR CIRCUIT

LIGHT SENSITIVE CONTROL

BACKGROUND OF THE INVENTION

Object detectors and location controls have been employed in various applications in the past. For example, edge detectors have been employed in the metals industry for observing the edge of a moving sheet of metal and employing the edge detector for actuating mechanism for steering the sheet or moving the rolls upon which the sheet is carried. Center controls have also been employed which observe both edges of a moving sheet to insure that the sheet is centered. Similar controls have been used in the printing and textile industry for controlling the movements of paper webs and cloth webs and for automatic contour seaming in the sewing of sleeved shirts, blouses and the like. Similar controls have been used also for other moving material in sheet or strip form, such as film, foil and plastics.

The edge and object location detectors have taken various forms including both pneumatic and photoelectric detectors. Photoelectric detectors, in some respects have been proved to be more versatile, but in some applications have required frequent adjustment. For example, readjustment of the setting of response circuits has been required as the ambient light changed or variations in extraneous light took place when daylight entering through windows changed according to the hour of the day or with movement of clouds. The changes in indoor illumination, and the changes in the use of lamps required in a workroom have also necessitated readjustment of the photoelectric response circuit. Abrupt changes in light have also been a serious problem as a result of movement of machinery such as cranes and the like, either casting shadows from overhead illumination or by movement of lamps carried on such machinery. Likewise, flashes of light resulting from reflections of sunlight or interior lamps with the rotation or movement of polished machinery have interfered with the functioning of photoelectric object location detectors.

It is, accordingly, an object of the invention to provide light sensitive control apparatus which is insensitive to variations in ambient light.

A more specific object of the invention is to provide object location detection systems utilizing a property of an illuminating system which is independent of ambient light and extraneous illumination.

Other and further objects, features and advantages of the invention will become apparent as the description proceeds.

PRELIMINARY DESCRIPTION

In carrying out the invention in accordance with a preferred form thereof as applied in an edge detector for moving sheet material, a lamp housing and a photodiode housing are mounted on opposite sides of the position where the edge of the moving sheet material is intended to travel, so that the photodiode is responsive to variations in light intercepted by the edge of the moving sheet in case of transverse displacement of the edge. Conventional mechanism is provided for correcting the position of the edge in response to the output of the photodiode. The effect of extraneous light is overcome by arranging the system to utilize pulses of light instead of continuous illumination. This is accomplished either by interposing means for producing pulses of light in the energizing circuit for the lamp or by employing mechanism such as a shutter in the lamp housing between the lamp itself and the light beam exit from the lamp housing. Similarly, the photodiode is provided with an electrical response and amplifying detecting circuit of such a type as to respond to electrical impulses of the same frequency and wave form as the pulsed light beams.

As a further assurance of the limitation of the effect of extraneous light, the lamp or light source used is preferably of a type emitting radiation in only limited portions of the radiant spectrum such as infrared lamp for example, and the photodiode is of the type which is responsive in the same portion of the spectrum.

However, the invention is not limited to the use of infrared lamps and in accordance with another aspect of the invention, a long, tubular, fluorescent lamp is employed, which may illuminate both edges of a moving sheet, and photoelectric responsive detectors may either be mounted at both edges of the moving sheet for center control or at the edge for edge control. For producing regular light pulses in accordance with one aspect of the invention, either the lamp is pulsed electrically at a selected frequency or a tubular shutter surrounding the tubular lamp is provided with a longitudinal slot or slots in the shutter and with means for rotating the shutter at a suitable speed corresponding to a frequency different from that of an interfering light source.

A better understanding of the invention will be afforded by the following detailed description considered in conjunction with the accompanying drawings.

DETAILED DESCRIPTION

Figure 1:
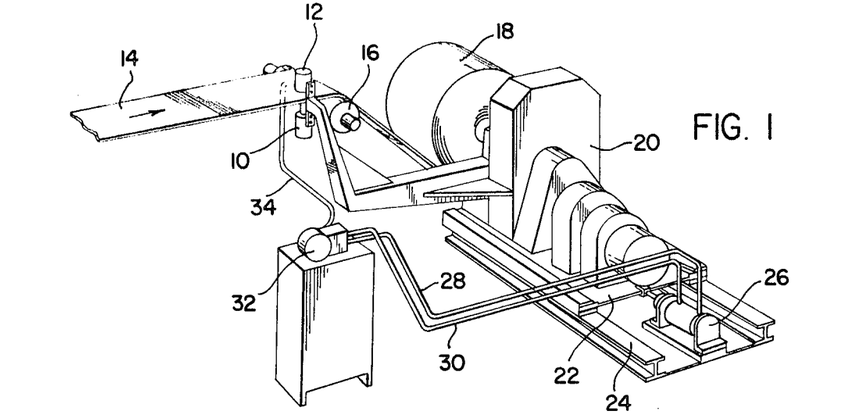
FIG. 1 is a perspective view of edge control apparatus in which light sensitive control in accordance with the invention may be employed.
Figure 2:
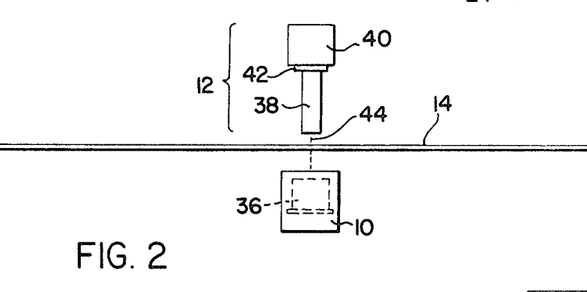
FIG. 2 is a fragmentary side view of a strip passing through the apparatus of FIG. 1 with a light sensitive control represented schematically.
Figure 4:
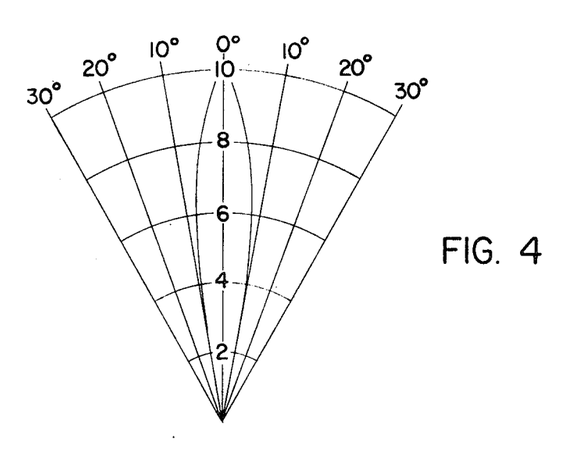
FIG. 4 is a polar diagram of a typical radiation pattern of the type of light source employed in the circuit of FIG. 3.

In the embodiment of the invention employed in FIGS. 1 and 2 a light sensitive control including a lamp in a lamp housing 10 and a light sensitive control system 12 are employed for observing the edge position of a moving strip 14 and actuating suitable mechanism for maintaining the edge of the strip 14 in the desired position. Other than the light source in the housing 10 and the light sensitive control 12 the apparatus illustrated in FIG. 1 may be conventional with the strip 14, which may, for example, be metal strip passing from olls (not shown) between the lamp housing 10 and the light sensitive control 12, over an idle roll 16 to a coil 18 of conventional recoiler apparatus 20, including a drive motor and mounted upon a plate 22 slidable axially with respect to the axis of the coil 18 upon a base 24 under the control of an hydraulic cylinder 26 and piston mechanism with hydraulic lines 28 and 30 to a valve mechanism 32 actuated by the light sensitive control systeM 12 and connected thereto by electric conductors 34. As one factor in minimizing the effect of extraneous light a lamp 36 is mounted in a lamp housing 10 of a type which may be pulsed with narrow time periods of emission and which produces emission narrowly confined in both space and frequency spectrum. An infrared solid state lamp of the type sold by the General Electric Company under the designation SSL/35 and by other manufacturers such as Monsanto, Fairchild and Texas Instruments has been found to be satisfactory. This is a high output gallium arsenide solid state infrared lamp producing noncoherent radiation at 9,400 Angstroms at 25° C. As illustrated in FIG. 4, it has a narrow radiation pattern with substantially all of the radiation confined within a solid angle of 20°, or 10° on either side of the axis of the lamp. It may be pulsed at 900 pulses per second in response to a 900-hertz, narrow pulse, square-wave energizing circuit with high intensity bursts of illumination which are relatively narrow for example, 300 microseconds wide and capable of very steep rise and fall, for example, 0 to 90 percent, and 100 percent to 10 percent in less than 500 nanoseconds.

In order to take advantage of the narrow beam emitted by the solid state lamp 36, the light sensitive control system 12 is preferably provided with a collimating tube 38 in advance of a photosensitive detector unit 40. The detector unit 40 is provided with a photoelectric response element sensitive to infrared radiation. As an additional factor in minimizing the effect of extraneous light a filter 42 for 9,400 Angstroms is preferably interposed in the beam 44 entering the photosensitive detector unit 40, for example, as shown mounted between the collimating tube 38 and the unit 40.

Although the invention is not limited to specific locations for the lamp or radiation source and the detector or light responsive control, in industrial applications, preferably as shown in FIGS. 1 and 2, the lamp housing 10 is below the strip and the light sensitive detector element of the control 12 is above the strip, the position of which is being controlled or observed. Any material that falls onto the lower element falls upon the light source and not upon the detector. The detector is the more sensitive of the two and dirt falling on it would have a greater effect that if it fell on the light source. Moreover, the detector or light responsive element has less background light to contend with if it is looking down. Consequently, there is less danger of such excessive background light reaching the detector as to saturate the photodiode with high illumination and interfere with the detection of pulsed light.

Figure 3:
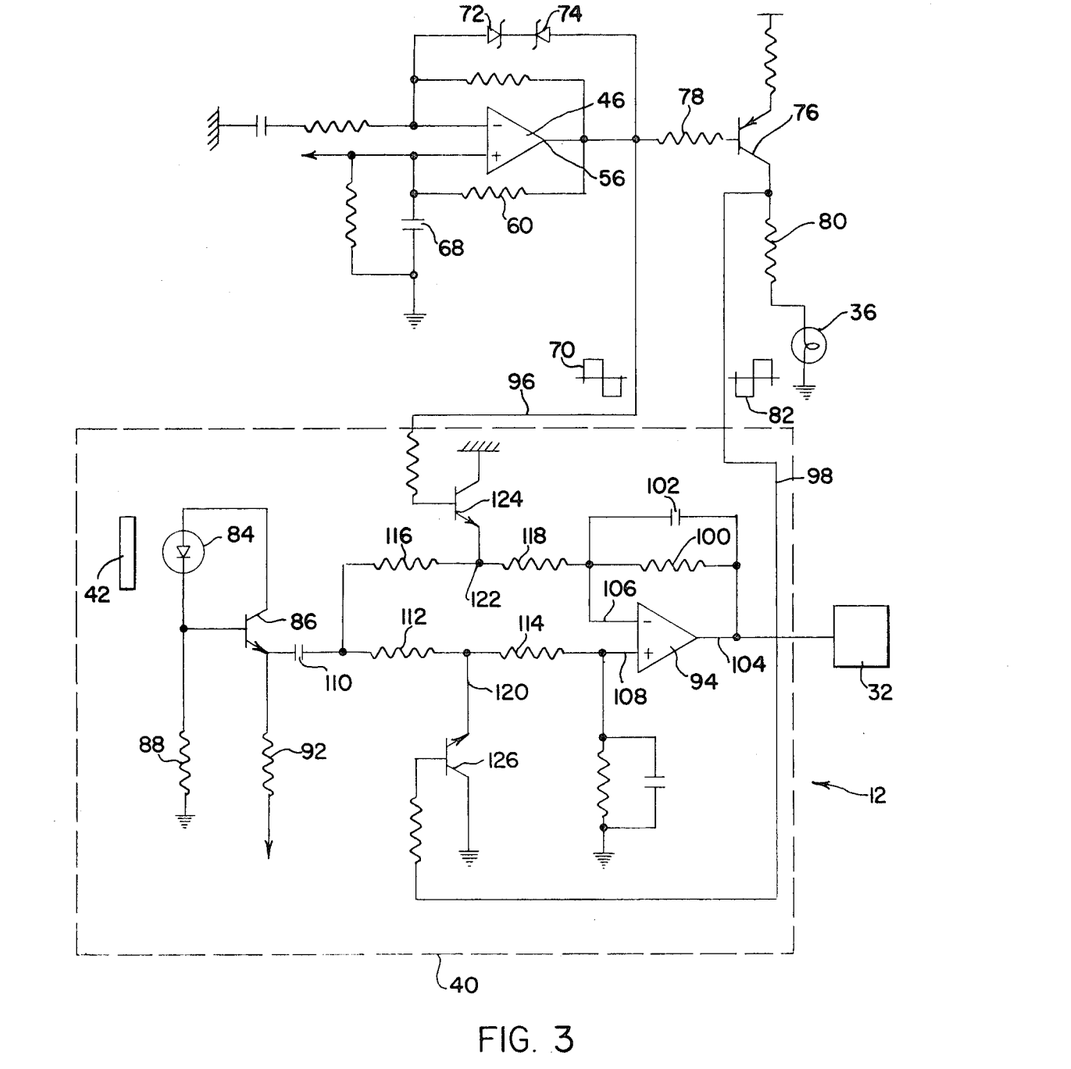
FIG. 3 is a circuit diagram of a light sensitive control operating with a predetermined frequency of interruption of illumination.

The light source diode 36 is pulsed at a frequency which is selected to avoid interference from frequencies present in extraneous illumination such as 60 cycle central station power and the rotation frequency of shafting and other parts having polished surfaces which may produce the extraneous light reflections and low enough to avoid introduction of transient effects and radio interference. Preferably the frequency is of the order of 900 hertz, this may be accomplished by an energizing circuit supplying square wave current pulses to the light source diode 36. As illustrated in FIG. 3, an operational amplifier oscillator may be utilized in which the frequency of oscillation is determined by the electrical values of resistance and capacitance in the feedback lines.

As illustrated in FIG. 3 a standard operational amplifier circuit may be employed for producing squarewave pulses 70 and 82 of opposite phase. Pulse 82 is used to pulse the lamp 36. It may utilize an integrated circuit 48 such as that produced by various manufacturers, e.g. a Fairchild type 741 integrated circuit.

The light source diode 36 is energized from the output 56 through an amplifying inverter stage 76 shown as a PNP transistor with its base coupled to the operational amplifier output 56 through a resistor 78. The light source diode 36 is connected in the collector circuit of the transistor 76 in series with a load resistor 80. The transistor stage 76 also serves to provide an inversion of the output wave 70 of the operational amplifier 46 so that a square wave of opposite phase represented by the diagram 82 appears at the collector terminal of the transistor 76. The time constants of the coupling elements of the operational amplifier 46 are so chosen as to provide an oscillation frequency of suitable value, preferably of the order of 900 hertz.

The photosensitive detector unit 40 contains a photoelectric response element 84 which may take the form of a photodiode or a photo-transistor or a photoconductor cell. A suitable amplifying circuit is provided for the photodiode 84 which is selectively responsive to the oscillation frequency of the operational amplifier 46. As shown it utilizes a transistor amplifier 86. A filter circuit is interposed between the amplifier transistor 86 and the hydraulic-valve, strip shifting control element 32, which includes an operational amplifier 94 and intermediate stage. For synchronizing the detector amplifier circuitry with the oscillator 46, connecting lines 96 and 98 are provided to feed the pulse signals 70 and 82 to the gates 124 and 126. The operational amplifier 94 has feedback network comprising a resistor 100 connected in parallel with the capacitor 102 between the output 104 and the inverting input 106. The noninverting input 108 is coupled to the emitter of the transistor 86 through a coupling capacitor 110 and series connected resistors 112 and 114. The inverting input 106 is also coupled to the emitter of the transistor 86 through the capacitor 110 and series connected resistors 116 and 118. Junction terminal 120 of the coupling resistor 112 and 114 and junction terminal 122 of the coupling resistors 116 and 118 serve as terminals for receiving synchronizing gate signal. Transistors stages 124 and 126 are used as clamp gate controlled by the synchronizing lines 96 and 98, that connect the alternate half cycle of the photodiode output to (+) and (−) input 108 and 106 of the amplifier 94 alternately, to give additive output at line 104.

OPERATION

The feedback connections provided in the operational amplifier 46 produce oscillation determined by the time constants of the resistors and capacitors in the system. The outputs are the opposite phased square wave signals 70 and 82.

When the strip 14 shown in FIGS. 1 and 2 shifts in such a direction as to uncover a larger proportion of the light beam emitted by the lamp 36 the increased light falling upon the photodiode 84 increases the conductivity thereof, thereby increasing the potential at the base of the transistor 86 and thus increasing the flow of current through the transistor 86 and the load resistor 92 with a resultant rising potential at the emitter of the transistor 86. If the light beam is a pulsed square wave, the pulse amplitude will increase. This increase in A.C. amplitude is communicated through the coupling capacitor 110 and the resistors 112 and 114 to the non-inverting input 108 of the operational amplifier 94 tending to increase the output thereof. However, the same signal is communicated through the coupling of resistors 116 and 118 to the inverting input 106 of the operational amplifier 94. Whether the inverting input or the non-inverting input is effective in the output of the operational amplifier 94 depends upon the instantaneous polarity of the synchronizing pulses 70 and 82. If the pulse of illumination occurs during the period of time that the positive half wave of the square wave 70 is applied to the transistor 124 and the negative wave of the square wave 82 is applied to the transistor 126, the transistor 124 is turned on to clamp the junction 122 to ground and cause the output of the transistor 86 to be ineffective at the inverting input 106. On the other hand, the negative potential applied to the base of the transistor 126 turns it off so that it has no effect at the junction terminal 120, permitting the pulsed signal at the emitter of the transistor 86 to be transmitted to the non-inverting input 108 of the operational amplifier 94 so as to increase the output voltage at 104 and the current supplied to the strip shifting mechanism 32. After half the period, the signal after the capacitor 110 inverts its polarity and the negative half of the square wave 70 is applied to the transistor 124 and the positive half of the square wave 82 is applied to the transistor 126 the transistor 124 will be turned off and the transistor 126 will be turned on so as to clamp the non-inverting input 108 of the operational amplifier 94 and permit the signal at the inverting input of the operational amplifier 94 to be amplified. The output of the operational amplifier 94 has the reverse sign of the signal at 110 because during this period the signal at 110 has been reversed or is negative. Therefore, the output at 104 is again positive and adds to the previous output. Thus the detection system is synchronized with the production of illumination pulses by the oscillator operational amplifier 46 and the signal output will be additive at both half cycles. For any other frequency of signal the output at each half cycle will be out of phase and the average will be zero; therefore, the detector is responsive to the synchronized light pulses only.

The invention is not limited to the use of electrical elements having predetermined constants. However, satisfactory operation has been obtained where the elements had constants of the following values:

| | |
|---|---|
| Resistor 88 | 1 megohm |
| Resistor 92 | 10,000 ohms |
| Resistor 112 | 25,000 ohms |
| Resistor 114 | 2,000 ohms |
| Resistor 116 | 25,000 ohms |
| Resistor 118 | 2,000 ohms |
| Resistor 100 | 250,000 ohms |
| Resistor 130 | 10,000 ohms |
| Resistor 66 | 250,000 ohms |
| Capacitor 68 | 0.01 mfd. |
| Capacitor 102 | 0.01 mfd. |
| Resistor 58 | 250,000 ohms |
| Resistor 60 | 125,000 ohms |

SECOND EMBODIMENT

Figures 5, 6:
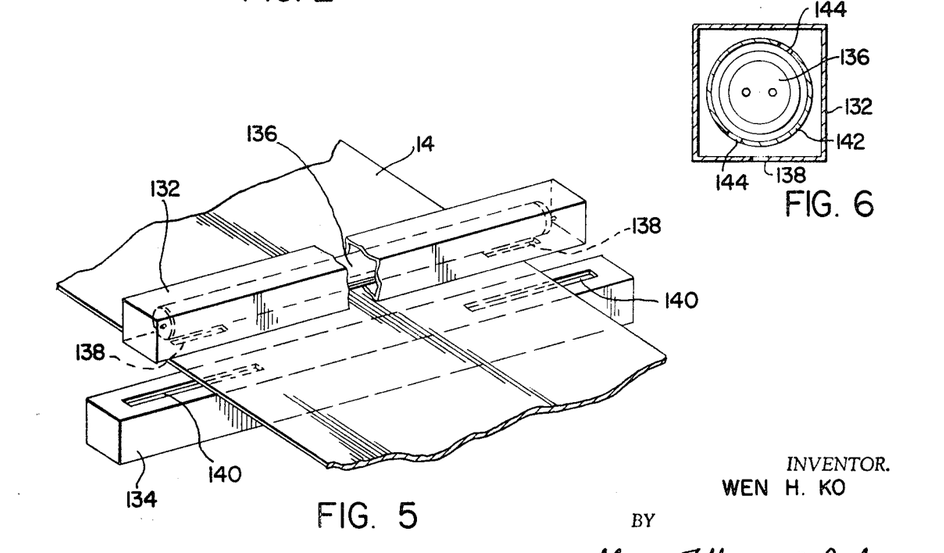
FIG. 5 is a fragmentary perspective view of another form of edge control.
FIG. 6 is a cross-sectional view of the lamp and illumination interrupting means employed in the apparatus in FIG. 5.

In the embodiment illustrated in FIGS. 5 and 6 provision is made for examination of both edges of the moving strip 14 simultaneously. An elongated lamp housing 132 and an elongated photosensitive detector 134 are provided which are mounted in proximity to the moving strip 14 and extending beyond the edges thereof. Within the lamp housing 132 an elongated tubular lamp 136 such as a fluorescent lamp is mounted. Elongated slots 138 are provided near the ends of the lamp housing 132 extending beyond the positions the edges of the strip 14 are expected to occupy so that illumination is cast upon the detector unit 134. The latter is provided with translucent windows 140 serving to distribute the illumination of the lamp 136 to suitable photoelectric detectors (not shown) within the detector unit 134. For accomplishing interruption of the illumination of the light sensitive detector unit 134 by the lamp 136 at predetermined frequency in the embodiment of FIGS. 5 and 6, electrical means may be employed to power the lamp at 900 hertz.

Figure 7:
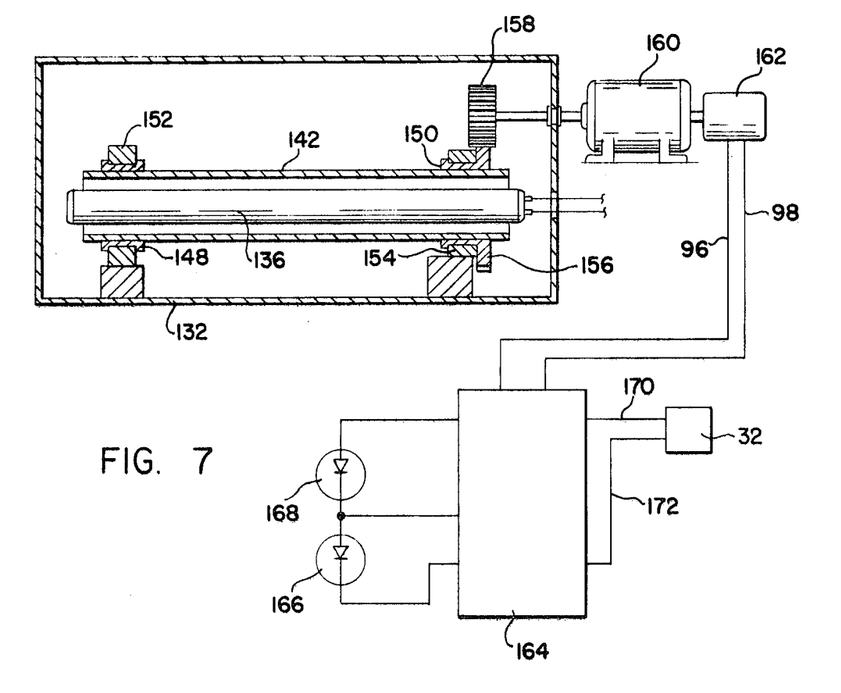
FIG. 7 is a diagram, partially in section of the control system for the apparatus in FIG. 5.

However, in the embodiment of FIGS. 5 and 6, suitable means are provided for rotatably mounting a shutter 142 with a longitudinal slot 144 in the lamp housing 132. For example, as illustrated in FIG. 7, the cylindrical shutter 142 may be secured to journals 148 and 150 rotatable in bearings 152 and 154 mounted in the housing 132. One of the journals 150 is formed with a pinion 156 integral therewith or secured thereto but adapted to mesh with a gear 158 driven by a constant speed motor 160. The shaft of the motor 160 also carries the rotor of a synchronizing generator 162 having output lines 96 and 98 serving for synchronizing the amplifying means provided for the photoresponsive detectors mounted in the detector unit 134.

A photoresponsive detector amplifier system 164 is provided which may be similar to that illustrated in FIG. 3 except that two photostrips of sensitive detectors 166 and 168 are employed, mounted in opposite ends of the photodetector housing 134, with output conductors 170 and 172.

The use of the relatively long tubular fluorescent lamp for center control where it is desired to observe both edges of a moving strip at the same time has been described. However, the invention is not limited to such use of relatively long lamps such as fluorescent lamps. The invention does not exclude the use of relatively long lamps for edge control in conjunction with a single photo-responsive detector. A long lamp may be desirable for some applications in the steel industry, for example, where detector housings are made massive for ruggedness and it is desirable not to have to move the lamp to illuminate the edge of the strip for different edge positions of the strip, but to move only the detector.

One of the advantages of the invention is that, by the use of a suitable lamp, light pulses may be produced which are sharp, having a rapid buildup and short delay time so as to obtain a high degree of discrimination from interference from other light. The invention is not limited to the use of the previously described solid state lamps or to fluorescent lamps and does not exclude light sources such as an injection laser. Injection lasers can be pulsed at high frequency, producing a high intensity, narrow beam with radiation restricted to a narrow frequency band. Likewise, the invention does not exclude the use of discharge tubes or stroboscopic lamps or other types of lamps which avoid the mass of incandescent filaments.

OPERATION OF SECOND EMBODIMENT

As in the embodiment of FIGS. 1 to 4 the frequency at which the amplifier 164 is responsive corresponds to the frequency of power supply of the illumination from the lamp 136. The variations in extraneous light, occurring at a different frequency from the frequency of the pulsed supply and the amplifier 164, are without effect upon output signal from the amplifier 164. Likewise, gradual changes in extraneous illumination resulting from gradual variations in sunlight have very little effect upon the output of the amplifier 164, since the amplifier 164 is responsive to alternating currents whereas such gradually changing extraneous illumination produces variations in direct current effect. Furthermore, the slow varying signal is chopped to be alternately positive and negative. At the output of the amplifier 164 the average of this chopped signal will be zero. Thus, the control exerted upon the strip position adjustment control 32 is substantially independent of variations in extraneous illumination.

THIRD EMBODIMENT

In the embodiments previously described, synchronization of the photo-responsive detection with the light pulses is achieved by electrical coupling between the detection circuit and the oscillator circuit supplying the lamp. However, I have found that interference with extraneous light and interference with the frequency of a power source producing such extraneous light may also be avoided without precise frequency control of the pulsing of the light utilized for strip or object position control. Satisfactory operation may be achieve even if the light pulses occur at random or drift in frequency.

Figure 8:
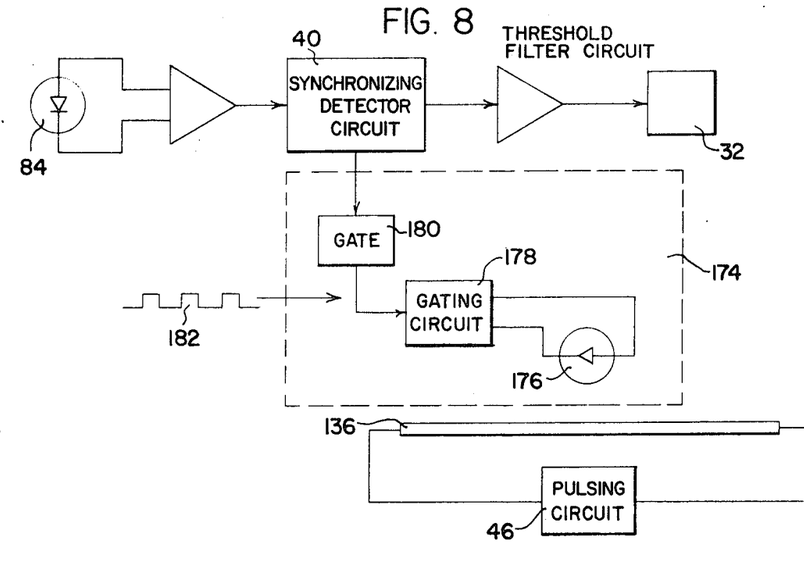
FIG. 8 is a diagram of edge or center control apparatus which adapts itself to variations or drifts in the frequency of pulsing of the light source and which uses a synchronizing detector circuit for synchronizing the object position detector with the pulsing of the light.

When it is desired to accommodate to a pulsed light source in which variations may take place in pulsing frequency or where it is not desired to couple the detector circuit to the pulsing circuit, this may be accomplished by utilizing a separate detector circuit and a gating circuit as shown in FIG. 8. In this embodiment a synchronizing photo-responsive detector observes the light source and actuates a gate at the frequency of the light pulses to synchronize the strip-position detector with the light pulses.

Figure 11:
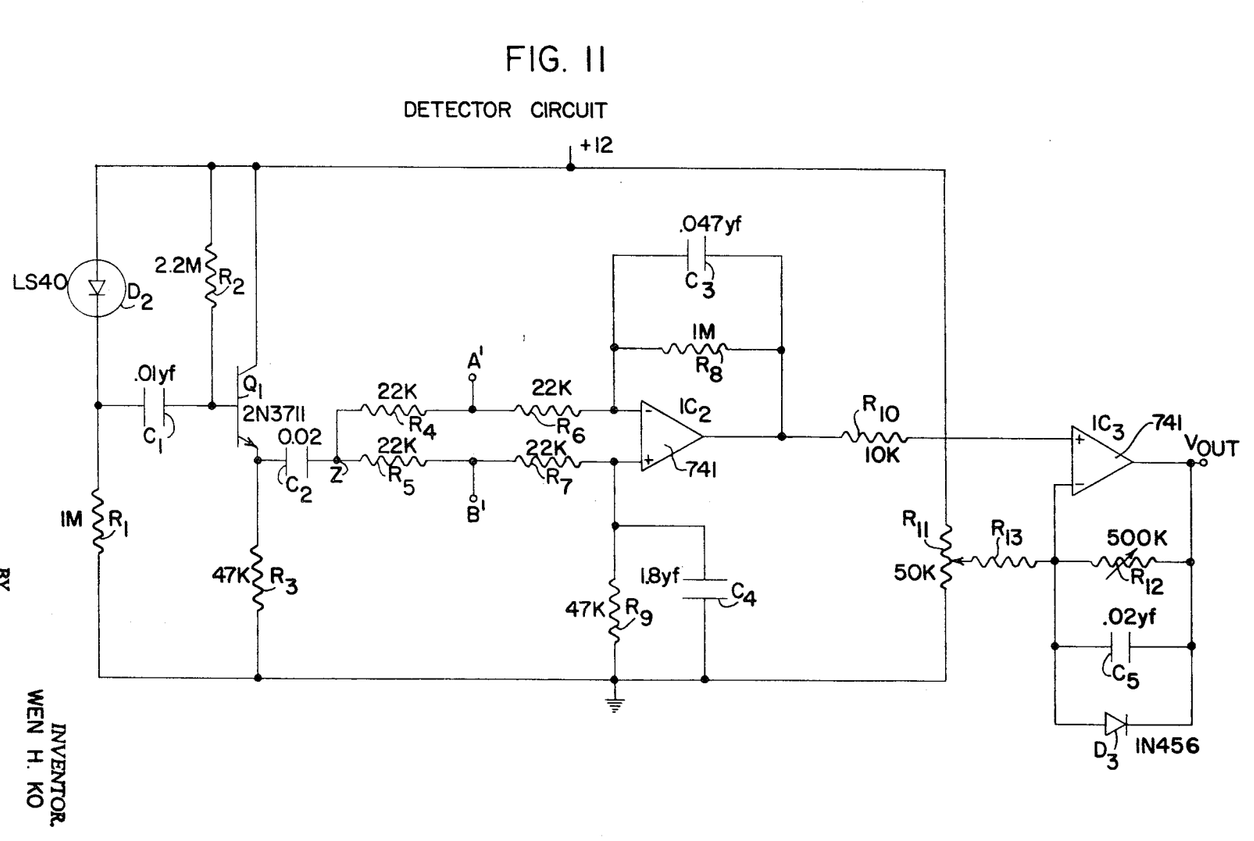
FIG. 11 is a circuit diagram for the detector circuit as employed in the embodiment of FIG. 8.
Figure 12:
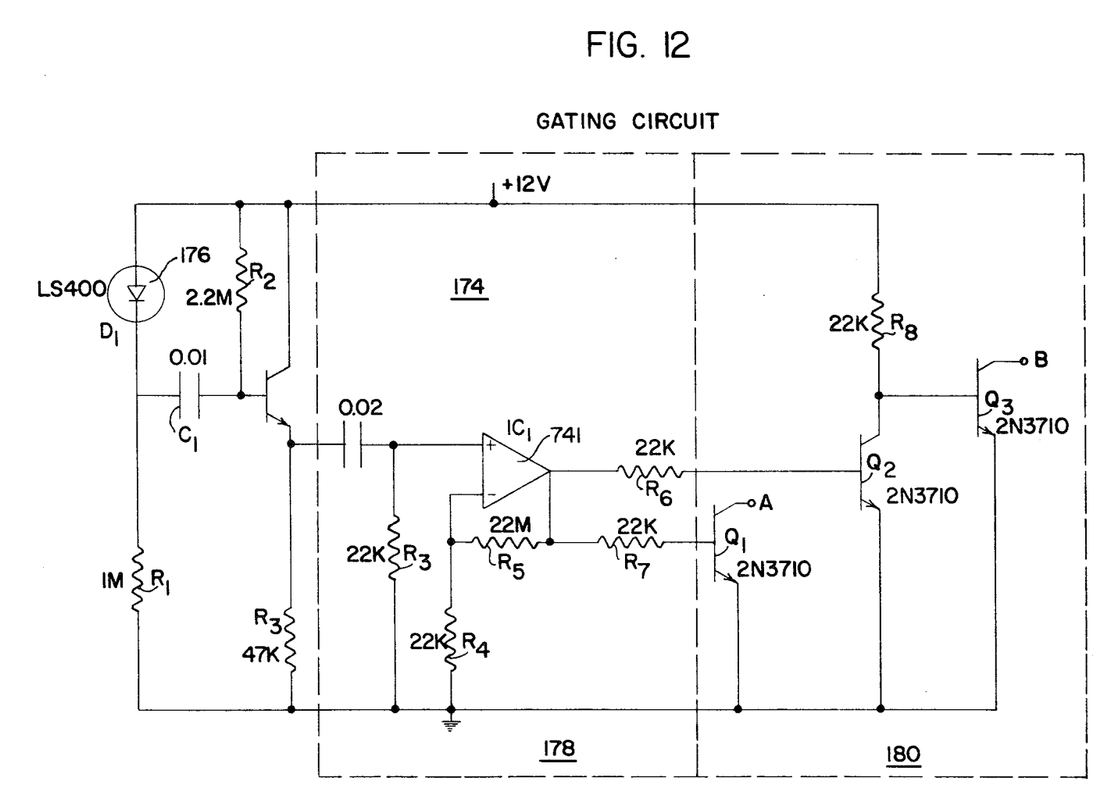
FIG. 12 is a circuit diagram of a gating circuit as used in the embodiment of FIG. 8

As illustrated in the FIG. 8, when it is desired to avoid utilizing a common oscillator for pulsing the light source or radiation source and the radiation detector, a pulse responsive system is provided, including a synchronizing radiation detector or photo-responsive element 176, a gating circuit 178 responsive to the detector 176 and a gate 180. The gate 180 is coupled to the synchronizing detector circuit 40 in the same manner as the output of the pulsing oscillator of FIG. 3 is coupled to the synchronizing detector circuit 40. The coupling is indicated in greater detail in the circuit diagrams of FIGS. 11 and 12. The gating circuit 178 produces an output wave form 182 corresponding to the wave form of the output from the pulsed radiation source or lamp 36.

Figure 9:
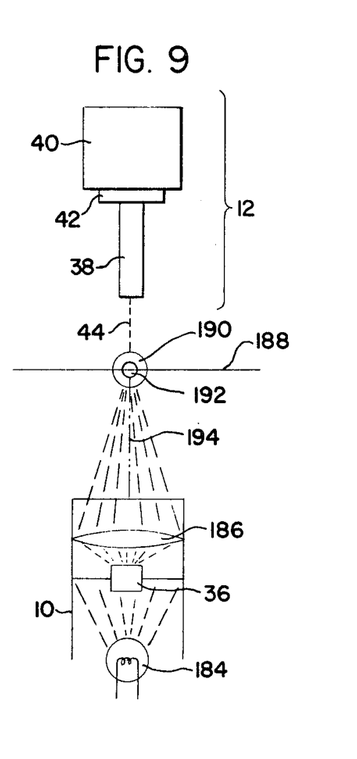
FIG. 9 is a diagram of an arrangement to provide visible light for lining up the apparatus when non-luminous radiation such as infrared light is utilized for the edge control apparatus.

As illustrated in FIG. 9, the lamp housing 10 may be constructed to contain two radiation sources. The two sources include the radiation source 36, to which reference has previously been made and which may, if desired, be a source of invisible light such as infrared radiation, and a supplemental light source 184, which may be an incandescent lamp or other source of visible radiation. When the supplemental lamp 184 is employed, suitable focusing and condensing means are provided as represented by a lens or system of lenses 186, which projects a luminous spot 190 on to the surface 188 being examined. The spot 190 is adjacent to or, as shown, is in the form of an annulus surrounding the spot 192, produced by the beam 194 projected from the infrared lamp 36.

The supplemental illumination source 184 serves two separate and distant purposes, either or both of which may be taken advantage of. If the source 36 is an infrared lamp or other source of invisible light or radiation the luminous spot 190 facilitates lining up the apparatus when the initial adjustment of the apparatus is made or when readjustments are made for observing strips of different widths or it is desired to adjust the position of the edge of the strip which the apparatus serves to control The other purpose served by the supplemental radiation source 184 is to improve the degree of linearity of the response of the detector circuit.

Figure 10:
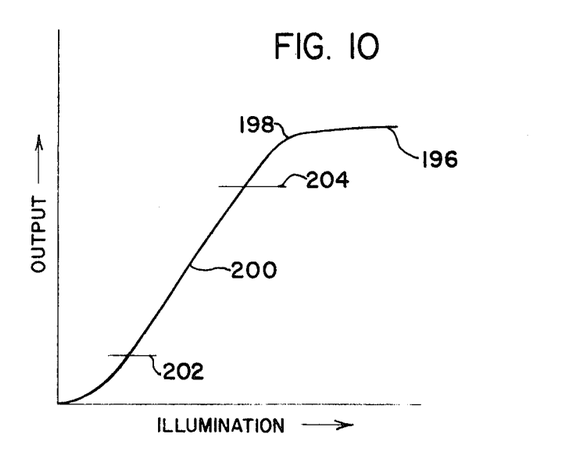
FIG. 10 is a graph illustrating the relationship between illumination and output of photo-responsive elements such as photodiodes as utilized in the apparatus, showing the effect of introducing the constant additional illumination as provided in FIG. 9.

As illustrated in FIG. 10, the curve 196 is illustrative of the relationship between the output of a photo-responsive detector such as a photodiode and the intensity of the illumination to which it is exposed. Near the zero point the curve rises gradually and becomes steeper and ultimately bends over to form a knee 198. In between there is a relatively linear portion 200 of the response curve. The use of the supplemental radiation source 184 causes the operating point of the photodiode on the response curve to shift. Consequently, when the beam 194 is partially or wholly uncovered by the strip the response of the photodiode is in the relatively linear range 200 between levels 202 and 204 of the curve 196 of FIG. 10.

FOURTH EMBODIMENT

Figure 13:
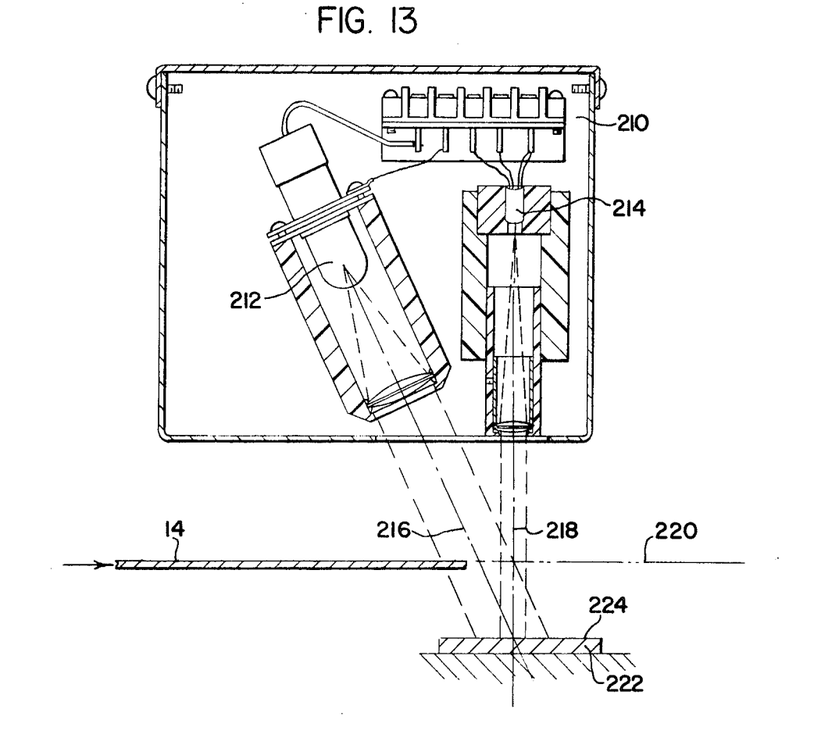
FIG. 13 is a diagram of a reflective light control.

In the embodiments previously described the radiation source and the radiation responsive device or detector are so arranged that the detector receives radiation by direct transmission. However, the invention is not limited thereto and does not exclude the use of a reflective control such as illustrated in FIG. 13, in which a control assembly 210 is employed containing both a radiation source 212 illustrated as a lamp and a radiation detector 214 which may be a photodiode mounted in a suitable assembly. The radiation source 212 and the detector 214 are so mounted that their optical axes 216 and 218 respectively, intersect at a surface 220. The movable strip 14 or other object, the location of which is to be observed or controlled, is suitably supported by rolls or the like such as illustrated in FIG. 1, so that its upper surface lies within the plane 220. In addition a background plate or the like 222 is mounted in such a position that it lies below the location along which the strip 14 travels so that the radiation from the source 212 directed toward the area along which the edge of the strip 14 is expected to move, is divided between the upper surface of the strip 14 and the upper surface 224 of the background plate 222.

Then the position of the edge of the strip 14 determines the relative amounts of radiation from the source 212 which are reflected by the strip 14 and by the surface 224 back into the assembly containing the detector 214. A background plate 222 is chosen, having its upper surface 224 differing as much as possible from the reflectivity of the strip 14. For example, if the strip 14 is polished tin plate strip or white or light colored sheet material, the background plate 222 is provided with a dark or black upper surface 224. On the other hand, if the strip 14 consists of dark material or distinctively colored material, the background plate 222 is provided with a light surface 224 or a surface of a color which upon reflection produces a different response in the detector 214 from that of the reflection from strip 14. In this manner, lateral movement of the strip 14 results in variations in the response of the detector 214 so that control may be effected in the same manner as described in connection with the other embodiments. Control assembly 210 can also be used as a line follower control, by placing the strip 14 in the plane of surface 220. Background plate 222 is not required since the strip serves as its own reflective surface. A line or other mark on the strip will change the amount of radiation reflected back to the detector 214 and will permit the control assembly 210 to follow the edge of this line.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore to cover all such modifications and variations as fall within the scope of the invention which is defined in the appended claims.

What is claimed is:

1. In a device for controlling the position of a web moving along a given path, said device including a radiation emitting means; and a radiation responsive means for providing a web control signal in response to radiation from said emitting means; the improvement comprising: means for controlling the position of said web as it moves along said path in response to changes in said control signal; means for pulsating said radiation emitting means at a selected frequency whereby said emitted radiation has said given frequency, and said radiation responsive means including means for creating said control signal only in response to radiation having a frequency generally corresponding to said selected frequency.

2. The improvement as defined in claim 1 wherein said pulsating means includes a first means for controlling said given frequency and said signal creating means includes second means for controlling its responsive frequency and synchronizing means for synchronizing said first and second means to said selected frequency.

3. In a device for controlling the position of a web moving along a given path, said device including a radiation emitting means; and a radiation responsive means for providing a web control signal in response to radiation from said emitting means; the improvement comprising: means for controlling the position of said web as it moves along said path in response to changes in said control signal; a circuit for creating a pulsating signal having a given frequency; circuit means for energizing said radiation emitting means by said pulsating signal; a gating circuit in said radiation responsive means, said gating circuit having an input portion responsive to pulsating radiation from said emitting means, a control portion for controlling the gating frequency according to an input pulsating signal and an output portion for creating said control signal when said pulsating radiation has a frequency corresponding to said gating frequency; and, means for directing said pulsating signal to said control portion of said gating circuit.

4. The improvement as defined in claim 3 including means for converting said pulsating radiation directed to said input portion of said gating circuit into a pulsating second signal having alternating portions of opposite polarity during each period of said second signal, and said output portion including a first branch for passing portions of said second signal having a first polarity and a second branch for passing portions of said second signal having a second polarity, and said control portion including means for alternately disenabling said parallel branches at a frequency corresponding to first mentioned pulsating signal.

5. In a device for controlling the position of a web moving along a given path, said device including a radiation emitting means; and a radiation responsive means for providing a web control signal in response to radiation from said emitting means; the improvement comprising: means for controlling the position of said web as it moves along said path in response to changes in said control signal; means for pulsating said emitting means at a given frequency; control means responsive to pulsating radiation for controlling the frequency of radiation for activating said radiation responsive means to create said control signal; and means for directing said pulsating radiation from said emitting means upon said control means whereby said radiation responsive means is activated by substantially only radiation of said given frequency.

6. In a radiation detector system including means for emitting a radiation beam; and, means responsive to said beam for creating a control signal, the improvement comprising: means for creating a pulsating control signal having first and second portions alternating at a given frequency; detector means in said beam responsive means for creating a detection signal having a frequency matching the frequency of said beam; means for controlling a capacitor by said detection signal; an operational amplifier means having an inverse first input, a non-inverse second input and a control output; a first circuit driven by said capacitor and connected to said first input; a second circuit driven by said capacitor and connected to said second input, a first clamping circuit driven by said control signal and connected to said first circuit for blocking passage of a signal through said first circuit when said first portion of said control signal exists; and a second clamping circuit driven by said control signal and connected to said second circuit for blocking passage of a signal through said second circuit when said second portion of said control signal exists whereby said operational amplifier means passes only said given frequency from said first and second circuits to said control output.

* * * * *